United States Patent
Ben-Shimon et al.

(10) Patent No.: US 10,986,819 B2
(45) Date of Patent: Apr. 27, 2021

(54) APPARATUS FOR DISINFESTATION OF BEEHIVES AND METHOD FOR CONTROLLING SAME

(71) Applicant: TOBE INFLUENCE INNOVATION LTD., Hod Hasharon (IL)

(72) Inventors: Avraham Ben-Shimon, Ayanot (IL); Offer Yogev, Hod-Hasharon (IL)

(73) Assignee: TOBE INFLUENCE INNOVATION LTD., Hod Hasharon (IL)

(*) Notice: Subject to any disclaimer, the term of this patent is extended or adjusted under 35 U.S.C. 154(b) by 481 days.

(21) Appl. No.: 15/580,283

(22) PCT Filed: Jun. 8, 2016

(86) PCT No.: PCT/IL2016/050598
§ 371 (c)(1),
(2) Date: Dec. 7, 2017

(87) PCT Pub. No.: WO2016/203463
PCT Pub. Date: Dec. 22, 2016

(65) Prior Publication Data
US 2018/0160656 A1 Jun. 14, 2018

Related U.S. Application Data

(60) Provisional application No. 62/175,349, filed on Jun. 14, 2015.

(51) Int. Cl.
*A01K 51/00* (2006.01)
*A01M 13/00* (2006.01)
(52) U.S. Cl.
CPC .............. *A01K 51/00* (2013.01); *A01M 13/00* (2013.01)

(58) Field of Classification Search
CPC combination set(s) only.
See application file for complete search history.

(56) References Cited

U.S. PATENT DOCUMENTS 2,624,925 A * 1/1953 Schmitz .................... A61L 9/03
422/125
3,754,861 A * 8/1973 Sadahiro ............. A01M 1/2066
422/126
(Continued)

FOREIGN PATENT DOCUMENTS

CN 102348377 A * 2/2012 .......... A01M 1/2072
DE 3308017 C1 * 3/1984 ............. A01K 51/00
(Continued)

OTHER PUBLICATIONS

Machine translation of FR-2547735-A1 to Petrillo, published Dec. 1984.*
(Continued)

*Primary Examiner* — Kathleen I Alker
(74) *Attorney, Agent, or Firm* — The Roy Gross Law Firm, LLC; Roy Gross

(57) ABSTRACT

An apparatus for disinfestation of beehives may include housing and a controller. The housing may include a receiving area for receiving a carrier comprising a fumigant and an automatic supply system adapted to extract a predetermined amount of fumigant from the receiving area. The automatic supply system may include a delivery mechanism that is configured to extract a first predetermined portion of the carrier comprising the predetermined amount of fumigant from the receiving area. The controller may be configured to control the automatic supply system to extract the first portion of the carrier according to a treatment protocol.

13 Claims, 6 Drawing Sheets

(56) References Cited

U.S. PATENT DOCUMENTS

| | | | | |
|---|---|---|---|---|
| 3,778,924 | A * | 12/1973 | Okui | A01M 1/2088 43/129 |
| 4,286,754 | A * | 9/1981 | Jones | A61L 9/127 239/44 |
| 4,735,358 | A * | 4/1988 | Morita | A01M 1/2072 206/389 |
| 4,965,287 | A | 10/1990 | Stendel et al. | |
| 5,479,948 | A * | 1/1996 | Counts | A24F 47/008 131/194 |
| 5,619,984 | A * | 4/1997 | Hodson | A61M 15/0048 128/203.15 |
| 5,655,523 | A * | 8/1997 | Hodson | A61M 15/0028 128/203.12 |
| 5,657,574 | A * | 8/1997 | Kandathil | A01M 1/2066 43/125 |
| 6,078,728 | A * | 6/2000 | O'Rourke | A01M 1/2077 392/390 |
| 6,446,426 | B1 * | 9/2002 | Sweeney | A01M 13/00 131/194 |
| 6,871,794 | B2 * | 3/2005 | McEwen | A01M 1/2044 239/44 |
| 8,567,113 | B2 * | 10/2013 | Pask | A01M 17/004 43/125 |
| 9,357,759 | B2 * | 6/2016 | Anderson | A01M 1/2022 |
| 2002/0151249 | A1 | 10/2002 | Rudiak | |
| 2003/0071030 | A1 * | 4/2003 | Zobele | A01M 1/2077 219/390 |
| 2012/0052109 | A1 * | 3/2012 | Watkins | A01N 25/34 424/443 |

FOREIGN PATENT DOCUMENTS

| | | | |
|---|---|---|---|
| DE | 3335808 | 8/1985 | |
| DE | 19636498 A1 * | 3/1998 | ............ A01K 51/00 |
| DE | 19943711 A1 * | 3/2001 | ............ A01K 51/00 |
| DE | 102006021144 B3 * | 9/2007 | ............ A01K 51/00 |
| DE | 102013214609 A1 | 1/2015 | |
| DE | 102014110009 A1 * | 1/2016 | ............ A01N 31/08 |
| DE | 202017100888 U1 * | 3/2017 | ............ A01K 51/00 |
| DE | 102016001934 A1 * | 8/2017 | ............ A01K 47/06 |
| EP | 0218162 A2 | 4/1987 | |
| EP | 2272332 | 12/2011 | |
| EP | 2789227 | 10/2014 | |
| FR | 2547735 A1 * | 12/1984 | ......... A01M 1/2077 |
| GB | 337311 A * | 10/1930 | ............ A01N 65/38 |
| GB | 2122903 A * | 1/1984 | ......... A01M 1/2077 |
| JP | 01080242 A * | 3/1989 | ............ A01K 47/06 |
| RU | 2239313 | 11/2004 | |
| WO | WO-9012644 A1 * | 11/1990 | ............... A61L 9/03 |
| WO | WO-0184061 A2 * | 11/2001 | ............... F23R 3/40 |
| WO | WO2014/151732 A1 | 9/2014 | |

OTHER PUBLICATIONS

Machine translation of DE 102013214609 to Varta Microbattery GMBH, published Jan. 2015 (cited on Mar. 25, 19 IDS).*
European Search Report for EP application No. EP16811131.8, dated Jan. 24, 2019.
International Search Report of Application No. PCT/IL2016/050598 dated Sep. 11, 2016.
Office Action from RU Application No. 2017147038 dated Dec. 25, 2020.

* cited by examiner

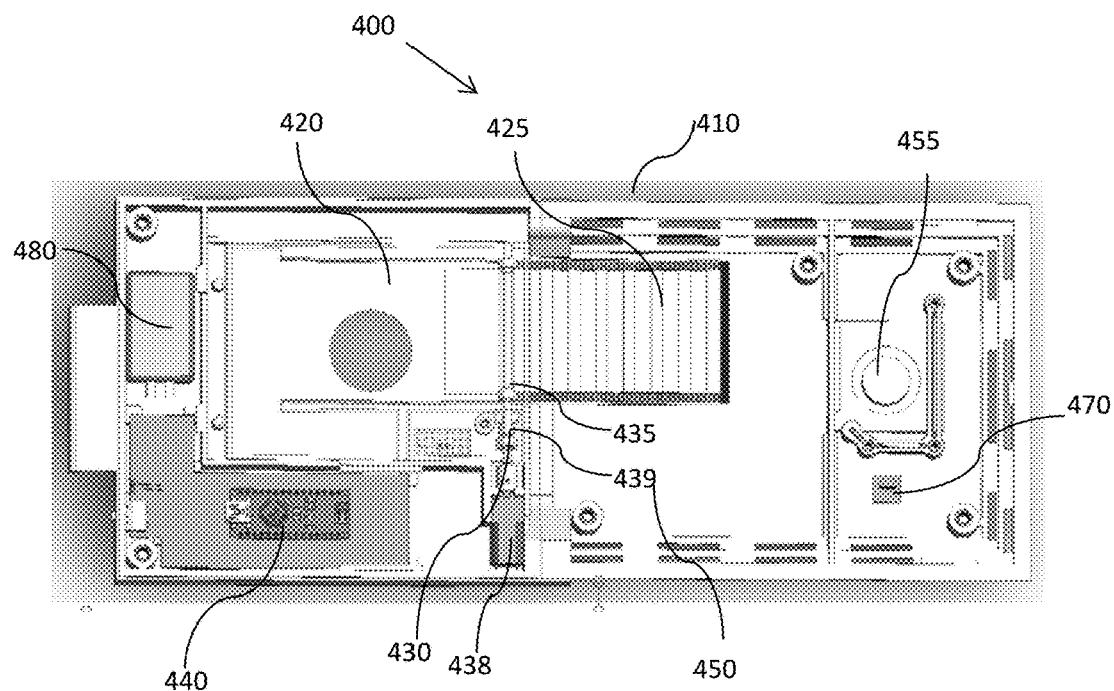
FIG. 4
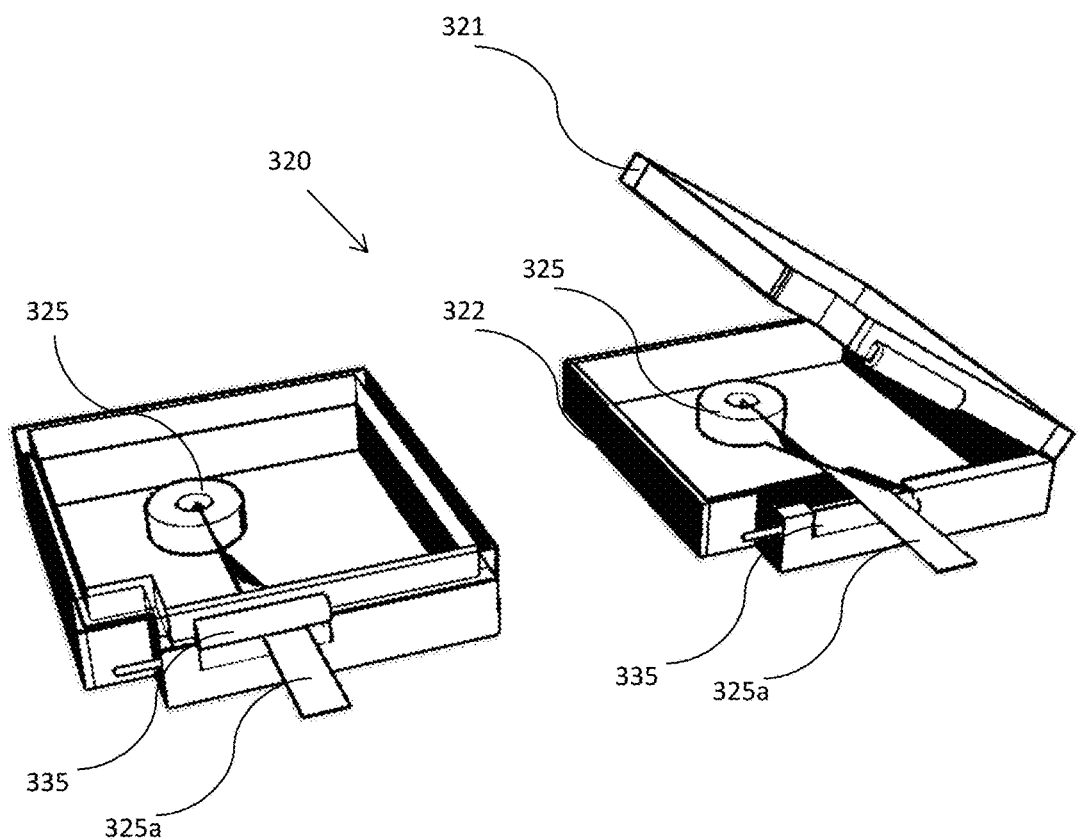
FIG. 5A
FIG. 5B

APPARATUS FOR DISINFESTATION OF BEEHIVES AND METHOD FOR CONTROLLING SAME

CROSS-REFERENCE TO RELATED APPLICATIONS

This application is a National Phase Application of PCT International Application No. PCT/IL2016/050598, International Filing Date Jun. 8, 2016, claiming priority of U.S. Patent Application No. 62/175,349, filed Jun. 14, 2015, which is hereby incorporated by reference.

BACKGROUND OF THE INVENTION

Fumigation is a widely known method for pest control. Fumigation acts by filling an enclosed area of interest (e.g., a beehive) with gaseous of an active compound such as pesticides or any other fumigant that affects the pests within this enclosed area.

Fumigation has several advantages; it is usually quick-acting and can result in total eradication of the pest, it allows diffusing through all parts of the treated area and thus can reach hidden and narrow places that are usually difficult to be reached with other pest-control techniques. On the disadvantages side, fumigants could have significant inhalation hazardous to the applicator and the fumigation activity may be greatly affected by environmental conditions such as temperature and humidity. Fumigants could be in any initial state of matter and for non-gaseous materials the transition to the gas phase could range from immediate and spontaneous of highly volatile fumigants to completely non-spontaneous for non-volatile fumigants. The latter must be assisted by an external energy source in order to be evaporated or sublimated in room temperature. A common fumigation technique for using non-volatile fumigants is by impregnating it within a combustible fumigation strip. The combustible fumigation strip can be ignited and the fumigant transformed to a gas phase during the combustion procedure. Although usually used with non-volatile fumigants, combustible fumigation strips could be also very useful when immediate and intensive amount of a volatile fumigant is required.

In beekeeping, fumigation is commonly used against mites such as the tracheal mite, Acarapis woodi and the varroa mites (V. jacobsoni/V destructor). The long capping period that characterizes the life cycle of the varroa mites limit the activity of almost all fumigants only to the phoretic stage of the mite, thus enforcing continuous release of volatile fumigants inside the hive for long period of time. Even fumigants like formic acid, which are capable of partly acting on the varroa mites during its reproduction stage, namely within the caped cells, still need to be applied for long period of time in order to keep and maintain the hive clean from varroa. The uncontrolled environmental conditions such as temperature and humidity within and outside the hive for such a long periods of time, limits considerably the effectiveness use of spontaneous fumigants. When the temperature is too low the fumigants do not evaporate enough and when the temperature is too high, excess evaporation can results in high toxicity to the bees.

Controlled evaporation in known fumigation devices is commonly achieved by using a heat source which increases the temperature of a liquid fumigant on demand. However, beehives are scattered in un-urban areas without accessible electricity and the energy consumption of such a heat source depended devices, especially for long period of time, is expected to be extremely high and thus uneconomically for battery use.

Combustible fumigation strips are quick and short time acting and thus much less susceptible to changes in environmental conditions. Yet since the activity of the active compounds commonly impregnated within the combustible fumigation strips is also mostly limited only to the phoertic stage of the varroa. Usually, between 5-7 separate treatments at 3-5 days intervals are required in order to achieve an effective treatment. Moreover, for optimal efficiency, the combustible fumigation strips must be applied before sunset when all the bees are back in the hive. The necessity for such a repeated treatment limited by a specific time window along the day combined with optional inhalation hazardous to the applicator makes the use of combustible fumigation strips almost impractical for most beekeepers.

Therefore it would be highly desirable to have an apparatus which is capable of automatically control either the evaporation of liquid fumigants independent of a heat source and/or the repeated ignition and turn off of combustible fumigation strips.

SUMMARY OF THE INVENTION

Embodiments of the invention may be directed to an apparatus for disinfestation of beehives. The apparatus may include housing and a controller. The housing may include a receiving area for receiving a carrier comprising a fumigant and an automatic supply system adapted to extract a predetermined amount of fumigant from the receiving area. In some embodiments, the automatic supply system includes a delivery mechanism that is configured to extract a first predetermined portion of the carrier comprising the predetermined amount of fumigant from the receiving area. The controller may be configured to control the automatic supply system to extract the first portion of the carrier according to a treatment protocol.

Some embodiments of the invention may be directed to a method of controlling disinfestation of beehives. Embodiments may include determining a treatment protocol for supplying a fumigant to a beehive, the treatment protocol may include supplying a predetermined amount of fumigant at predetermined time and controlling an automatic supply system to extract a first predetermined portion of a carrier comprising the predetermined amount of fumigant from a receiving area according to the treatment protocol. In some embodiments, the automatic supply system may include a delivery mechanism that is configured to extract the first predetermined portion of the carrier.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an illustration of a top view of an exemplary apparatus for disinfestation of beehives according to some embodiments of the invention;

FIGS. 5A and 5B are illustrations of an exemplary receiving area in a form of a cassette according to some embodiments of the invention;

Figure 1:
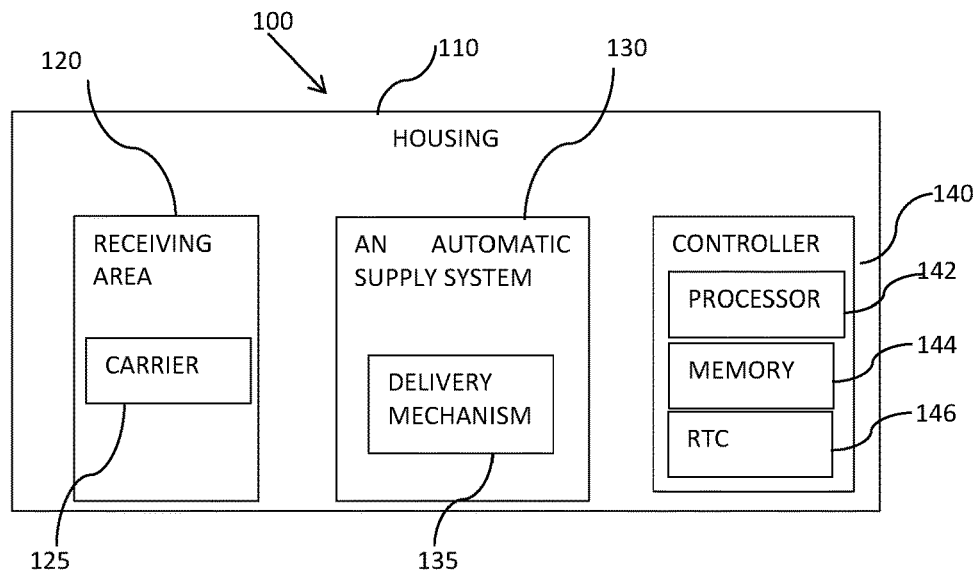
FIG. 1 is a block diagram of an exemplary apparatus for disinfestation of beehives according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be related to an apparatus for disinfestation of beehives and methods for controlling such apparatus. An apparatus according to embodiments of the invention may allow continues application and supply of fumigants to the beehive over long periods of times (e.g., weeks) at relatively low energy consumption (e.g., powered by a battery). The apparatus according to embodiments of the invention may be applied to the beehive a predetermined controlled amount of fumigant every predetermined amount of time in order to ensure effective disinfection of the beehive over time. In some embodiments, the apparatus may be inserted into the beehive via the bees entrance, thus may be compacted into a relatively flat housing. The fumigant applied by the apparatus may be either in the liquid state (e.g., held in a tank) or in a solid state (e.g., soaked and dried on an absorbing carrier, included in a solid tablet or the like). The apparatus may be configured to cause the evaporation of the fumigant into the beehive space either actively (e.g., heating/igniting the carrier to cause evaporation) or passively (e.g., exposing a volatile fumigant to cause evaporation).

The application of the predetermined amount of fumigant may be controlled by a controller based on a treatment protocol. The treatment protocol may be determined by a beekeeper according to the treatment demands of a specific disinfestation problem (e.g., *varroa* mites). The treatment protocol may include the amount of fumigant to be applied to the beehive, the timing at which the amount is to be applied etc. In some embodiments, the treatment protocol may be determined or updated based on signals received by the controller from one or more sensors. The one or more sensors may be located in the beehive, in the apparatus, on the outside walls of the apparatus or the like. The one or more sensors may measure conditions in the beehive such as humidity and temperature that may affect the treatment protocol.

Reference is made to FIG. 1 which is a block diagram of an exemplary apparatus for disinfestation of beehives according to some embodiments of the invention. An apparatus 100 may include a housing 110 that includes a receiving area 120 for receiving a carrier 125 comprising a fumigant and a supply system 130 adapted to extract a predetermined amount of fumigant from receiving area 120. Apparatus 100 may further include a controller 140 configured to control supply system 130 to extract a first portion of carrier 125 according to a treatment protocol.

Figure 3A:
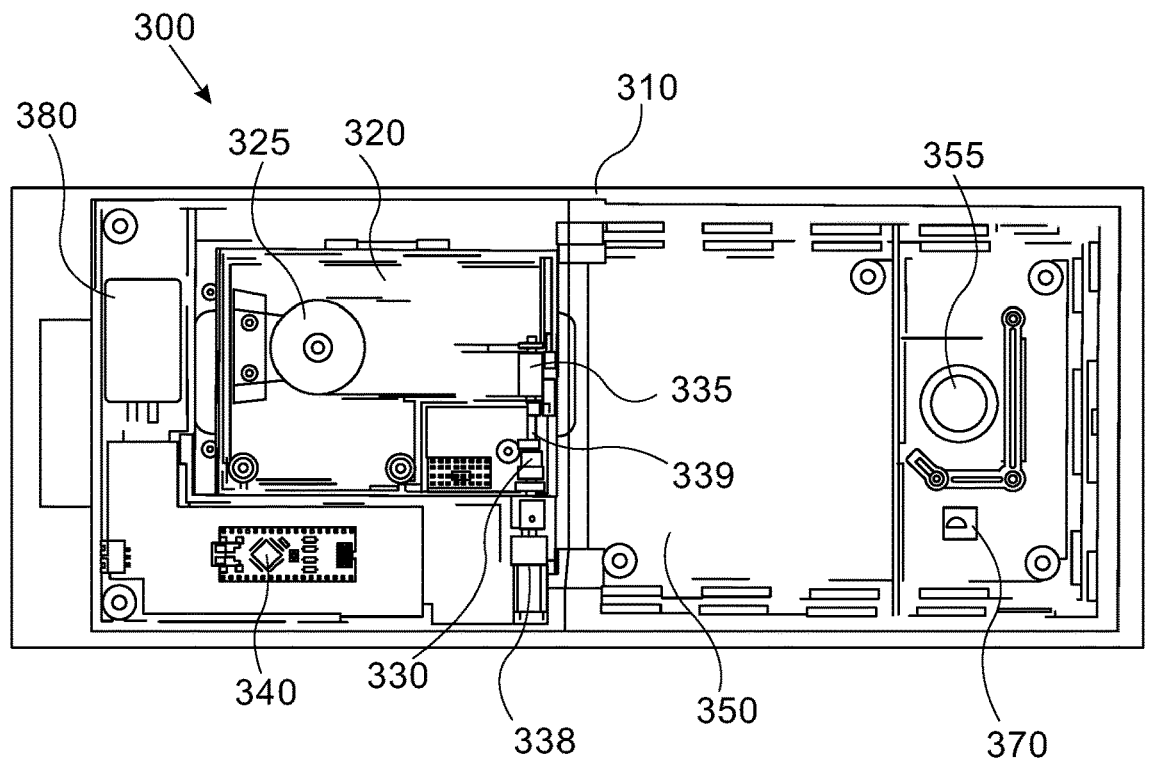
FIGS. 3A and 3B are illustrations of top view and isometric view of an exemplary apparatus for disinfestation of beehives according to some embodiments of the invention.
Figure 3B:
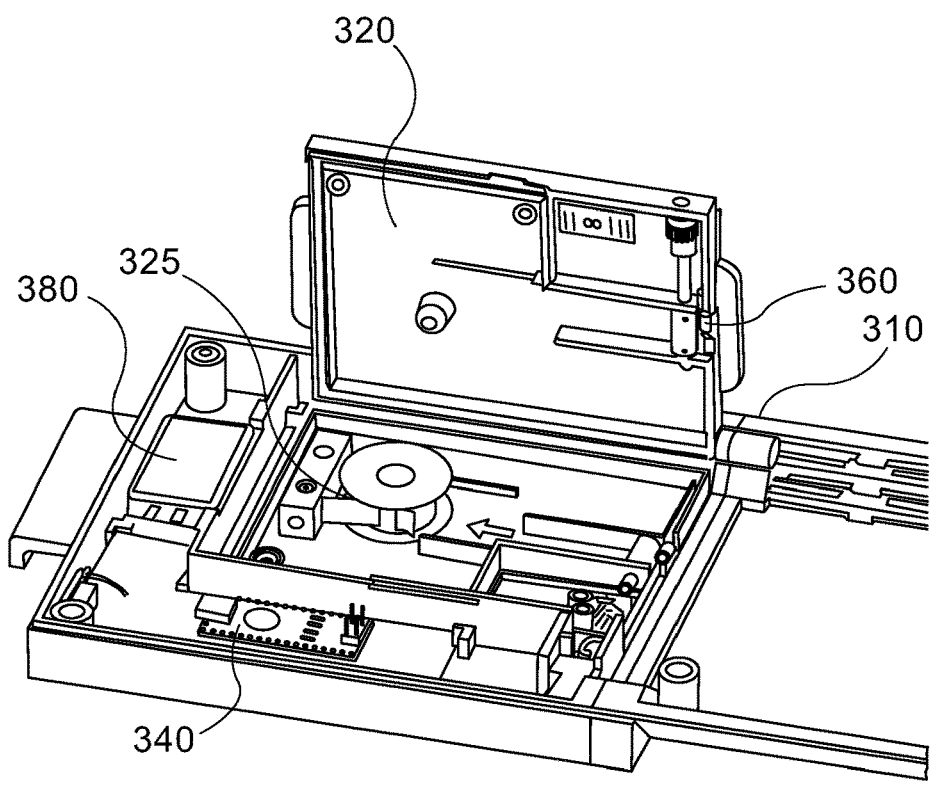

In some embodiments, housing 110 may include any suitable material for housing fumigants, mechanical and/or electrical components. Housing 110 may be made from various polymers, painted wood or the like. In some embodiments, housing 110 may be configured to be inserted to the beehive via a bee entrance opening in the beehive. Housing 110 may have a form of a flat box (as illustrated in FIGS. 3A-3B) having at least one dimension (e.g. thickness or height) of less than the width of the beehive opening (e.g., about 18 mm).

In some embodiments, receiving area 120 may be an open defined area in housing 110 or may be a closed or partially closed chamber in housing 110. Receiving area 120 may include or hold carrier 125. Carrier 125 may have any shape and form that may allow carrier 125 to carry the fumigant. In some embodiments, carrier 125 may include a receptacle for retaining the fumigant. For example, carrier 125 may have a shape of a movable tray/or shelf and the fumigant may be placed in the tray or on the shelf. For example, when the fumigant is a volatile material in the liquid state, the tray may be configured to hold a predetermined amount of the liquid fumigant. In yet another example, the tray or shelf may hold a volatile solid tablet comprising the fumigant. The carrier in this case may include both the tray/shelf and the tablet.

In some embodiments, carrier 125 may include absorbing material. The absorbing material may be soaked with fumigant. Some exemplary absorbing materials are illustrated and discussed with respect to FIGS. 5 and 6.

In some embodiments, automatic supply system 130 may include a delivery mechanism 135. Delivery mechanism 135 may be configured to extract a first predetermined portion of carrier 125 comprising the predetermined amount of fumigant from receiving area 120. For example, delivery mechanism 135 may be configured to push a trey carrying a volatile fumigant from a receiving chamber into an inner space of the beehive or a space in housing 110. In yet another example, delivery mechanism 135 may extract a portion of an absorbing material soaked with fumigant into the inner space of the beehive or a space in housing 110. The fumigant may be dried (e.g., in a solid state) on the absorbing material prior to be delivered into the beehive or at a liquid state.

In some embodiments, delivery mechanism 135 may be configured to retract a second predetermined portion of carrier 125 to receiving area 120. In some embodiments, by extracting and retracting carrier 125, delivery mechanism 135 may allow better control of the amount of fumigant exposed to the beehive, thus may allow a better on going control of the disinfestation process. For example, the delivery mechanism may be controlled by controller 140 to retract back into a receiving chamber at least a portion of a trey carrying liquid fumigant when a signal received by controller 140 (e.g., from a sensor such as sensor 270*a* illustrated in FIG. 2) indicates that the conditions in the beehive has changed.

In some embodiments, supply system 130 may include a motor (e.g., an electric motor) or any other actuator for actuating delivery mechanism 135 upon receiving a demand from controller 140. The motor or actuator may be configured to cause bidirectional motion of one or more motion producing elements such as: cylindrical rollers, a belt, a spring and a lead screw. In some embodiments, delivery mechanism 135 may include receptacle to receive carrier 125. The receptacle may be operably connected to the one or more motion producing elements.

In some embodiments, controller 140 may be configured to control at least some of the electrical and/or electromechanical components of apparatus 100. Controller 140 may include at least a processor 142 and a memory 144. In some embodiments, controller 140 may further include a real-time-clock (RTC) 146. Processor 142 may be a chip or any suitable computing or computational device. Memory 144 may include a memory chip, a flash memory, a volatile memory, a non-volatile memory, a cache memory, a buffer, a short term memory unit, a long term memory unit, or other suitable memory units or storage units. Memory 144 may store any executable code, e.g., an application, a program, a process, task or script. The executable code may include codes for controlling disinfestation of beehives according to some embodiments of the invention. The instructions and codes stored in memory 144 may be executed by processor 142 of controller 140. In some embodiments, controller 140 may include communication unit (not illustrated) configured to communicate with external devices, such as sensors, external processors or the like. The communication unit may include any known wired and/or wireless communication devices.

In some embodiments, controller 140 may be configured to control supply system 130 to extract a first portion of carrier 115 according to a treatment protocol. The treatment protocol may be stored as a code in memory 144. In some embodiments, controller 140 may be configured to control automatic supply system 130 to retract a second portion of carrier 125 according to the treatment protocol. Controller 130 may be configured to cause delivery mechanism 135 to move back and forth from receiving area 120 thus extracting and retracting carrier 125 according to the treatment protocol and/or signals received from one or more sensors 270. In some embodiments, RTC 146 may allow timing of the various elements of apparatus 100 based on real time signals and processor 142 control in real-time the operation of apparatus 100.

Figure 2:
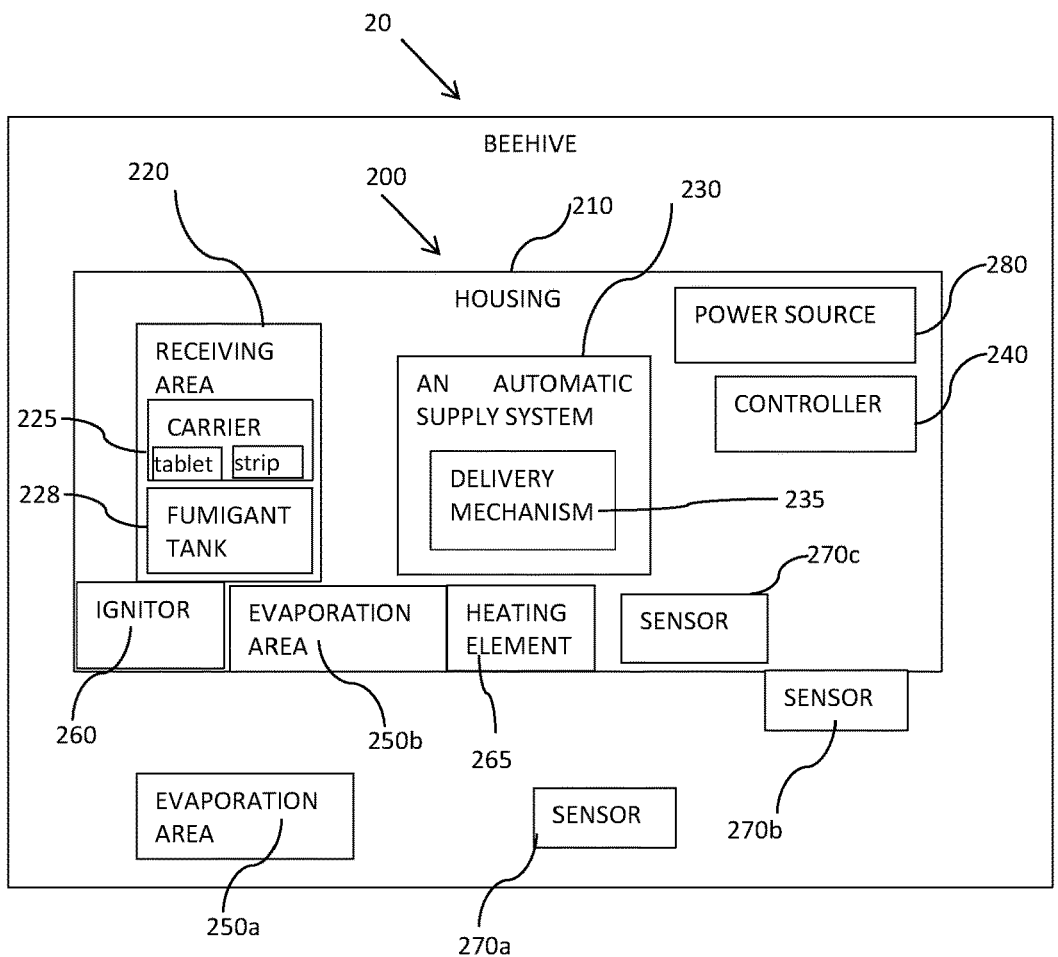
FIG. 2 is a block diagram of an exemplary apparatus for disinfestation of beehives according to some embodiments of the invention.

Reference is made to FIG. 2 which is a block diagram of an apparatus for disinfestation of beehives according to some embodiments of the invention. Apparatus 200 may include a housing 210 that includes a receiving area 220 for receiving a carrier 225, an automatic supply system 230 and a controller 240. Apparatus 200 may further include an evaporation area 250, an ignitor 260, one or more sensors 270 and a power source 280.

In some embodiments, housing 210 may be substantially the same as housing 110 of apparatus 100. Housing 210 may be inserted into beehive 20, for example, via the bee entrance. In some embodiments, receiving area 220 may be configured to receive a carrier 225 comprising a fumigant similarly to receiving area 120 of apparatus 100. In some embodiments, receiving area 220 may further include a tank 228 for holding the fumigant in a liquid phase. Tank 228 may be any container (either open or closed) for holding liquids. Tank 228 may include a pumping system for pumping the fumigant and/or a piping system for delivering the liquid fumigant to the carrier. For example, droplets of liquid fumigant may be dropped on a trey or an absorbing material (as illustrated and discussed with respect to FIG. 6B).

In some embodiments, supply system 230 may include a delivery mechanism 235 configured to extract a first predetermined portion of carrier 225 that includes the predetermined amount of fumigant from receiving area 220. Automatic supply system 230 and delivery mechanism 235 may include substantially the same elements as supply system 130 and delivery mechanism 135 discussed above.

In some embodiments, controller 240 may include substantially the same elements as controller 140. In some embodiments, controller 240 may be in communication with one or more sensors 270*a*, 270*b* and may receive signals from one or more sensors 270*a*-270*b*. Sensors 270*a*-270*b* may include sensors for sensing conditions inside beehive 20 and/or in the surroundings of beehive 20. Each of sensors 270*a*-270*c* may include a temperature sensor, a humidity sensor, audio sensor such as a microphone, a light sensor, a biosensor, a chemical sensor, a piezoelectric device or the like. Sensors 270*a*-270*b* may detect changes in the atmosphere of the beehive (e.g., temperature and humidity) and/or may detect changes in the behavior of the bees, for example, by detecting sounds and movements made by the bees. Controller 240 may be configured to receive signals from one or more sensors 270*a*-270*c* and analyze the signals to detect a change in the beehive. Based on the detected change (e.g., signal) controller 240 may determine or update the treatment protocol. Codes for such analysis and determination may be stored in memory 144.

In some embodiments, sensors 270*a*-270*c* may be located in a variety of places. For example, sensor 270*a* may be located inside the beehive at a location different from the location of apparatus 200. Sensor 270*a* may communicate with controller 240 by wired or wireless communication. Sensor 270*b* may be located on one of the outer walls of housing 210, facing inwardly towards the internal space of the beehive and sensor 270*c* may be located inside housing 210. Sensors 270*b* and 270*c* may communicate with controller 240 by wired or wireless communication.

In some embodiments, apparatus 200 may further include an evaporation area 250*a* or 250*b* for evaporating the fumigant. In some embodiments, delivery mechanism 235 may be configured to deliver the portion of carrier 225 comprising the fumigant to evaporation area 250*a* or 250*b*. Evaporation area 250*a* or 250*b* may be either a closed or partially closed chamber or a defined area with at least one open side to allow evaporation from evaporation area 250*a* or 250*b* to the internal space of the beehive. In some embodiments, evaporation area 250*a* may be external to housing 210 and may include a defined area in beehive 20. In some embodiments, evaporation area 250*a* may include the entire space of beehive 20. In some embodiments, evaporation area 250*b* may be included in housing 210.

In some embodiments, evaporation area 250*a* or 250*b* may include a ventilation system (not illustrated) for actively spreading the evaporated or fumed fumigant in the beehive. In some embodiments, the ventilation system may be controlled by controller 240. In some embodiments, evaporation area 250*a* or 250*b* may include a heating element 265 to heat carrier 225. The heating element may actively assist in the evaporation of the fumigant from carrier 225. The heating element may be controlled by controller 240. In some embodiments, evaporation area 250*a* or 250*b* may include a heating element and a ventilation system.

In some embodiments, apparatus 200 may further include an ignitor 260 for igniting at least carrier 225. Ignitor 260 may be located inside evaporation area 250*a* or 250*b*, at the exit from receiving area 220 into evaporation area 250*a* or 250*b*, at the exit from evaporation area 250*a* or 250*b* into beehive 20 or at any required place. Ignitor 260 may be controlled by controller 260, to ignite carrier 225 when the predetermined amount of fumigant is to be delivered into beehive 20.

In some embodiments, carrier 225 may include absorbing material soaked with at least the fumigant. An example for absorbing material may include filter paper strips, cotton fabric or any other absorbing material. In some embodiments, carrier 225 may include a combustible material. In some embodiments, the absorbing material may be the combustible material configured to be burned when ignited by ignitor 260. In some embodiments, the absorbing material may further be soaked with a burning control material, such as sodium or potassium nitrate. The burning control material may allow a controlled burning of the carrier over a defined period of time that allows the fumigant also soaked in carrier 225 to allow full evaporation of the fumigant.

In some embodiments, the fumigant soaked in carrier 225 may include at least one acaricide, such as, chlorobenzilate, bromopropylate, dicofol, tedion amitraz fluvalinate or the like.

In some embodiments, carrier 225 may include a strip soaked with the fumigant and delivery mechanism 235 may be configured to deliver a portion of the strip comprising the predetermined amount of fumigant from receiving area 210. In some embodiments, carrier 225 may include a plurality of absorbing material tablets soaked with the fumigant and delivery mechanism 235 may be configured to deliver one or more tablets from receiving area 210. The tablets or strips may be delivered to evaporation area 250 or directly to beehive 20.

In some embodiments, carrier 225 may include volatile solid tables comprising the fumigant. In some embodiments, delivery mechanism 235 may be configured to extract one or more of the volatile solid tablets from receiving area 210 to evaporation area 250*a*, 250*b* or directly to beehive 20.

In some embodiments, apparatus 200 may further include a power source 280, such as a battery located inside or outside housing 210. The battery may be a rechargeable battery. Power source 280 may supply power to at least some of the electrical and electromechanical elements of apparatus 200, such as supply system 230, controller 240, a ventilation system and/or heating element included in evaporation area 250, ignitor 260 and sensors 270. In some embodiments, power source 280 may be or may include solar panels system for utilizing solar energy to produce electricity. The solar panels system may directly power at least some of the elements of apparatus 200 (or 100) or may charge a battery included in power source 280, that in return powers the at least some of the elements of apparatus 200 (or 100). The solar panels may be assembled on a plate attached to the beehive, or attached to any object exposed to sunlight (e.g., a pillar) being electrically connected to apparatus 200 or the beehive.

Reference is made to FIGS. 3A and 3B which are illustrations of top view and isometric view of an exemplary apparatus for disinfestation of beehives according to some embodiments of the invention. An apparatus 300 is an example of an apparatus for disinfestation of beehives by igniting and burning a portion of a carrier soaked with a fumigant. Apparatus 300 is given as an example for apparatuses for disinfestation of beehives only and the invention as a whole is not limited to the design of apparatus 300. Apparatus 300 may include housing 310, a receiving area 320 in the form of a cassette, a delivery mechanism 335 and a controller 340. A receiving area in a form of a cassette may include replaceable, refillable, removable case that includes at least one carrier. Apparatus 300 may further include evaporation chamber 350, an ignitor 360, a temperature sensor 370 and a battery 380. In the example apparatus 300 all the elements included in the apparatus are located inside housing 310.

In some embodiments, receiving area 320 may have a form of a replaceable cassette configured to hold a strip of combustible carrier 325. The replaceable cassette may be configured to be assembled and dissembled from apparatus 300. For example, every time the strip of carrier 325 has been fully consumed and should be replaced, the cassette may be either replaced with a new cassette (when the cassette is disposable) or disassembled and refilled with a new carrier (when the cassette is reusable). In some embodiments, replaceable cassette receiving area 320 may be replaced by a different type of a receiving area for example, receiving area 420, illustrated and discussed with respect to FIG. 4. As illustrated in FIG. 3B both apparatus 300 and cassette-like receiving area 320 may be opened and closed for refilling of a new carrier 325. Carrier 325 may include a folded strip of any combustible material, such as filter paper or cotton. Carrier 325 may be soaked with a fumigant and further may be soaked with a burning control material.

In some embodiments, supply system 330 may include a delivery mechanism 335 in the form of at least one (e.g. two) roller(s), an electric motor 338 and a shaft 339 configured to deliver the rotary motion from motor 338 to delivery mechanism 335. Delivery mechanism 335 may be configured to extract (and retract if necessary) a portion of strip-like carrier 325 from cassette-like receiving area 320 to evaporation chamber 350. In some embodiments, ignitor 360 may be configured to ignite the portion of carrier 325 comprising a predetermined amount of fumigant in evaporation chamber 350, thus causing the fumigant soaked in the carrier to evaporate due to the heat formed by the burning of the carrier. In some embodiments, chamber 350 may further include ventilation system 355 in a form of a fan that is configured to spread the evaporated fumigant from evaporation chamber 350 into the beehive. In some embodiments, housing 310 may include materials (e.g., polymers/light alloys) that may endure the temperature of the burning carrier, for example, 150° C.

In some embodiments, controller 340 may include any printed circuit board (PCB) that includes at least a processor and a memory (such as processor 142 and memory 144) for controlling the various controllable elements of apparatus 300. For example, controller 340 may control motor 338 to rotate delivery mechanism 335 to extract a portion of carrier 325 from area 320. Controller 340 may further be configured to cause ignitor 360 to ignite the extracted portion and cause ventilation system 355 to circulate the evaporated fumigant. In some embodiments, controller 340 may be configured to receive signals indicative of the temperature in apparatus 300 and/or the beehive from sensor 370. In some embodiments, controller 340 may determine when to extract the portion of the carrier and ignite the carrier based on the received signals.

In some embodiments, motor 338, controller 340, ventilation system 355 and sensor 370 may all be powered by battery 380.

Reference is made to FIG. 4 which is an illustration of an example apparatus for disinfestation of beehives according to some embodiments of the invention. An apparatus 400 is an example apparatus for disinfestation of beehives by spontaneous evaporation of a volatile fumigant. Apparatus 400 is given as an example of apparatuses for disinfestation of beehives only and the invention as a whole is not limited to the design of apparatus 400. Apparatus 400 may include housing 410, a receiving area 420 in the form of a cassette, a delivery mechanism 430 and a controller 440. Apparatus 400 may further include evaporation chamber 450 having ventilation system 455, a temperature sensor 470 and a battery 480.

In some embodiments, all the elements included in apparatus 400 are located inside housing 410. In some embodiments, receiving area 420 may have a form of a replaceable cassette configured to hold liquid volatile fumigant and a trey-like carrier 425. Trey-like carrier 425 may further include an absorbing material, such as a sponge, for absorbing the liquid volatile fumigant. In some embodiments, receiving area 420 may further include a tank (not illustrated) for refilling of the sponge of carrier 425 with volatile fumigant in liquid state.

In some embodiments, supply system 430 may include a delivery mechanism 435 in the form of two cogwheels, an electric motor 438 and a shaft 439 configured to deliver rotary motion from motor 438 to delivery mechanism 435. Delivery mechanism 435 may be configured to extract and retract a portion of trey-like carrier 425 and the amount of fumigant that may evaporated in evaporation chamber 450 may be determined according to the size of the portion of trey-like carrier 425 that is extracted from area 420. Accordingly, the amount of fumigant that evaporates into the beehive may be determined according to the portion of trey-like carrier 425 that was extract to the space of evaporation chamber 450.

In some embodiments, controller 440 may include a PCB as controller 340 of apparatus 300. In some embodiments, controller 440 may cause motor 438 and delivery mechanism 435 to extract a first portion (e.g., ½ of the length) of trey-like carrier 425 to evaporation chamber 450. In some embodiments, controller 440 may receive signals from sensor 470 (e.g., a thermometer), the signals may indicate that the temperature in the beehive is higher than usual. Controller 470, may then determine that the portion of carrier 425 extracted or the duration at which carrier 425 is exposed in chamber 450 should be reduced, therefore, may cause delivery mechanism 435 to retract back a second portion (e.g., ¼ of the length) of trey-like carrier 425. In some embodiments, apparatuses such as apparatus 300 and apparatus 400 may be configured to receive, control and use both cassette-like receiving area 320 or 420 according to a decision made by a user.

Reference is made to FIGS. 5A and 5B which are illustration of cassette-like receiving area (e.g., chamber) in open and closed positions according to some embodiments of the invention. Cassette-like receiving area 320 may include a carrier 325 in the form of folded strip made from an absorbing material. The carrier may be soaked with fumigant in either a solid or liquid state. A first portion 325a of carrier 325 may be extracted from cassette-like receiving are 320, for example, by delivery mechanism 335. The first portion may include a predetermined amount of fumigant required for the disinfestations of the beehive. In some embodiments, cassette-like receiving are 320 may be configured to be openable in order to insert a new carrier 325.

In some embodiments, cassette-like receiving area 320 may include an upper part 321 and a lower part 322. The upper and lower parts are defined with respect the position of cassette-like receiving area 320 during the insertion or replacement of carrier 325. The two rollers that are included in delivery mechanism 335 may be split between upper part 321 and the lower part 322 respectively. In order to load, cassette-like receiving are 320 upper part 321 may be raised up and carrier 325 may be inserted into lower part 322. Delivery mechanism 335 may include two cylinders, an upper rollers and a lower cylinder as will be broadly explain below with respect to FIGS. 6A-6B. In the example embodiment illustrated in FIGS. 5A and 5B the upper cylinder is included in upper part 321 and the lower rollers is included in lower part 322, thus upon opening of cassette-like receiving are 320 the two cylinders detach from each other. It should be appreciated by a person skilled in the art that the arrangement illustrated in FIGS. 5A and 5B is an example only and any other arrangement or delivery mechanism can be included in a cassette-like receiving area 320 according to embodiments of the invention.

Figure 6A:
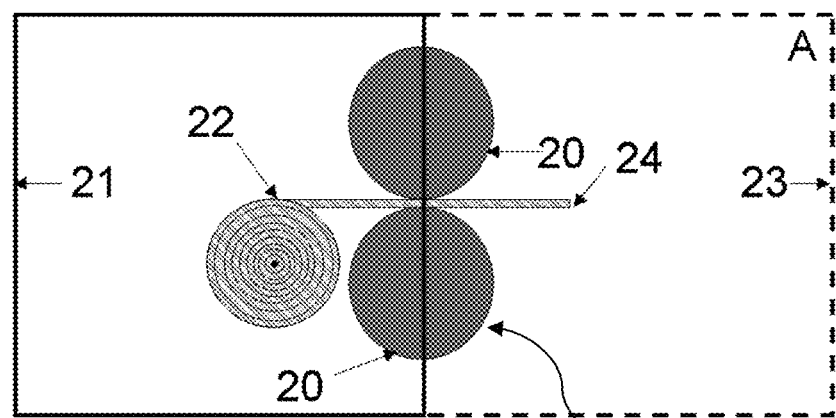
FIGS. 6A-6C are illustrations of various exemplary delivery mechanisms and carriers according to some embodiments of the invention.
Figure 6B:
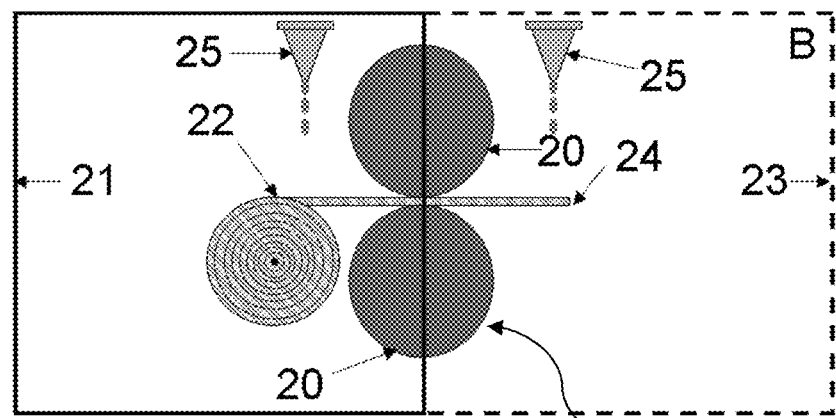
Figure 6C:
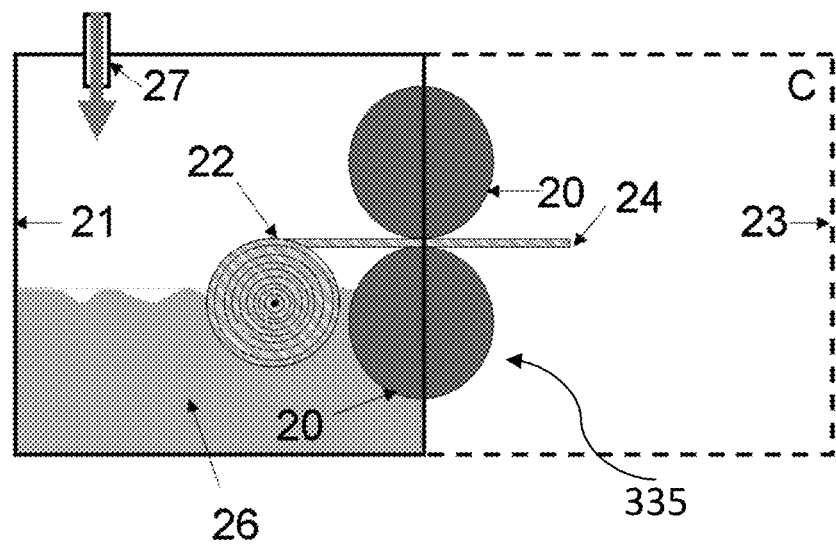

Reference is made to FIGS. 6A-6C which illustrate examples of delivery mechanisms and carriers according to some embodiments of the invention. In the embodiments of FIGS. 6A-6C a receiving area 21 may be isolated (e.g., sealed) from an evaporation area 23 which is open to the beehive (e.g., the desired fumigation space). Such embodiment may ensure that the fumigant carried by a carrier 22 may not evaporate uncontrollably into evaporation area 23. In some embodiments, carrier 22 may have a form of a folded strip (e.g., made from an absorbing material) and a delivery mechanism 335 that may include one or more cylinders (e.g., rollers) 20. Cylinders 20 may be positioned between sealed receiving area 21 and opened evaporation area 23. Cylinders 20 may roll and extract a first predetermined portion 24 of carrier 22 into opened evaporation area 23. First portion 24 may include a predetermined amount of fumigant that may be required for fumigation of the beehive. In some embodiments, one or more cylinders 20 may roll back and retract from evaporation area 23 a second predetermined portion of carrier 22 to sealed receiving area 21.

In some embodiments, the fumigant may be soaked and impregnated into carrier 22 before loading carrier 22 in receiving area 21, as illustrated in FIG. 6A. In some embodiments, the fumigant may be loaded or soaked into carrier 22 in receiving area 21 and/or by dripping apparatuses 25, as illustrated in FIGS. 6B and 6C. In the exemplary embodiment illustrated in FIG. 6B a liquid fumigant may be controllably dripped on carrier 22 from one or more dripping apparatuses 25 located inside receiving area 21 and/or in dripping apparatuses 25. Dripping apparatuses 25 may include or may be connected to a liquid fumigant reservoir (e.g., a tank) via inlet 27.

In the example embodiment illustrated in FIG. 6C carrier 22 may be at least partially immersed in a liquid fumigant reservoir (e.g., a tank) 26 located in sealed receiving area 21. Since carrier 22 may include strip of absorbing material, immersing at least a portion of the strip in liquid fumigant reservoir 26 may ensure (due to capillary forces) that any portion of carrier 22 is fully soaked with the liquid fumigant.

Figure 7A:
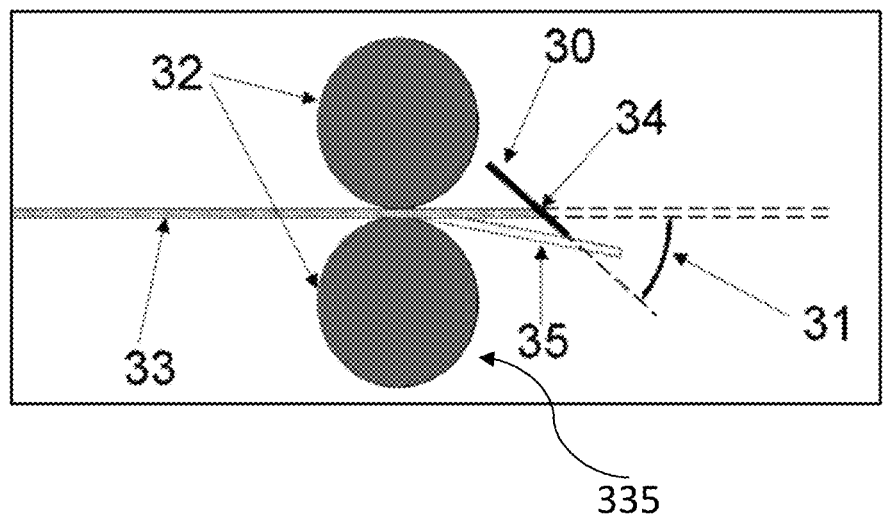
FIGS. 7A and 7B are illustrations of delivery mechanisms and examples for ignitors according to some embodiments of the invention.

Reference is made to FIG. 7A which is an illustration of a delivery mechanism and an ignitor according to some embodiments of the invention. Delivery mechanism 355, may be substantially similar to delivery mechanism 355 disclosed above. In the illustrated embodiment an ignitor 30 may be added in order to ignite a first portion of strip-like carrier 33 when the fumigation may require to evaporate the fumigant from the carrier by heat. Ignitor 30 may include tightly stretched high resistant conducting wire that may be heated by conducting electric current. For example, ignitor 30 may include a nickel chrome filament. In some embodiments, ignitor 30 may include any other system for igniting a combustible material for example, electrodes for forming an electric arc. In some embodiments, the ignitor may include an ignition system and an advancing system to allow advancing the ignition system into a contact with the combustible carrier in order to allow the ignition system to ignite the combustible carrier. According to some embodiments, the advancing system may retract back the ignition system. The ignition system may include electrodes for creating an electric arc, such as high resistant conducting wire or the like.

In the illustrated exemplary embodiment of FIG. 7, the wire filament included in ignitor 30 may be stretched in an angle 31 which may be smaller than ninety degrees with respect to the surface of the strip-like carrier 33. When carrier 33 is pulled out in between cylinders 32 of delivery mechanism 335 in the direction of the wire filament, carrier 33 may physically contact point 34 on the wire filament. Following the contact between carrier 33 and the wire filament at point 34, a controlled ignition of the carrier may be initiated (for example, by an instruction sent from a controller such as controller 240 to ignitor 30 to ignite the carrier). The wire filament of ignitor 30 may be positioned with respect to the surface of carrier 33, such that if carrier 33 is further extracted from the receiving area, after the ignition at contact point 34, at the same direction of the wire filament, carrier 33 may be capable of passing the wire filament while still contacting it, by banding at point 35, as illustrated. Thus carrier 33 may continue at the same direction as long as it is continually extracted out at least by one cylinder (e.g., roller), for example, in between two cylinders 32 illustrated in FIG. 7A. In some embodiments, the burning of the strip-like carrier may be passively terminated when the edge of the burning carrier reaches the at least one cylinders.

Figure 7B:
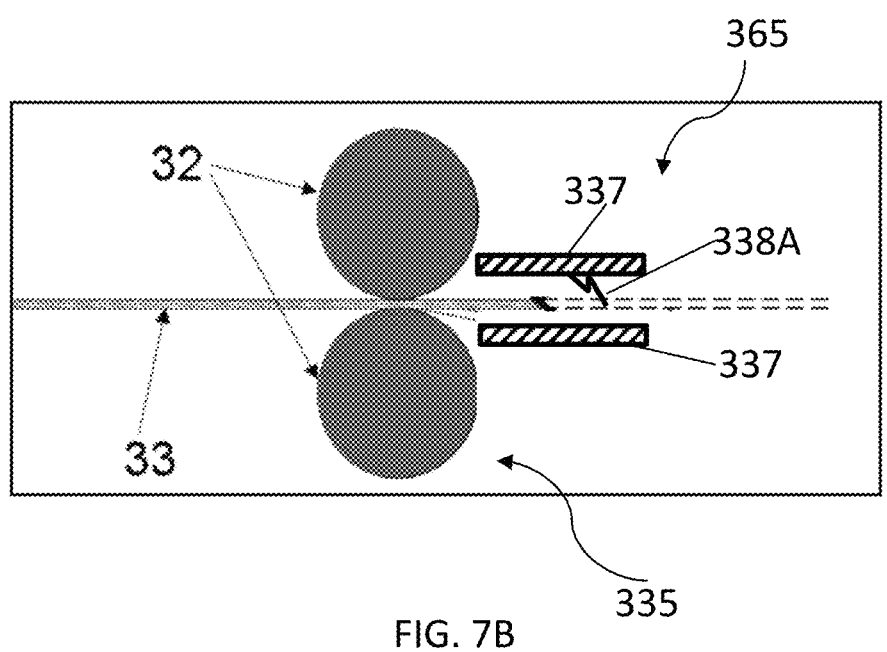

Reference is made to FIG. 7B which is an illustration of a delivery mechanism and an ignitor according to some embodiments of the invention. Delivery mechanism 335 may substantially the same as the one disclosed above. An ignitor 365 may include two conductive elements 337 that when held under a predetermined voltage may cause electric discharging and the formation of electric arc 338A that may ignite carrier 33. A controller such as controller 140 may be configured to cause the application of the predetermined voltage during or after the predetermined portion of carrier 33 was extracted.

Figure 8:
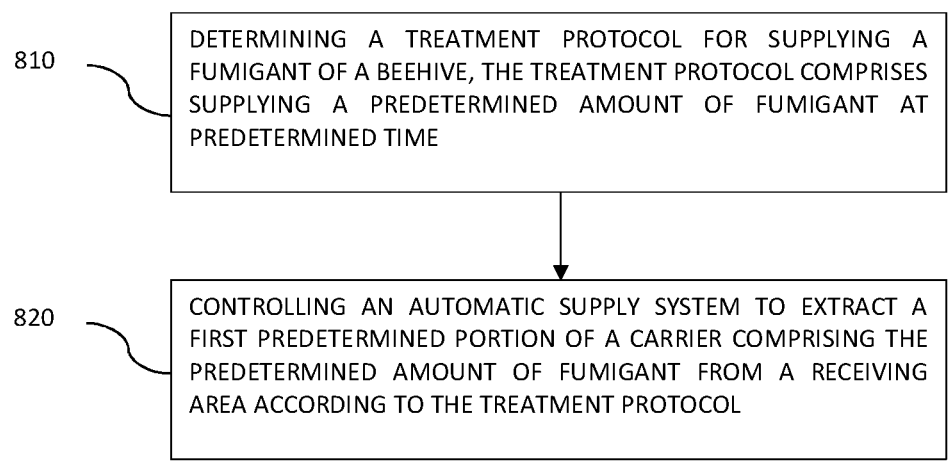
FIG. 8 is a flowchart of a method of controlling disinfestation of beehives according to some embodiments of the invention.

Reference is now made to FIG. 8 which is a flowchart of a method of controlling disinfestation of beehives according to some embodiments of the invention. The method of FIG. 8 may be performed by a controller, such as controller 140 of apparatus 100 or 240 of apparatus 200 or by any other controller. In box 810, embodiments may include determining a treatment protocol for supplying a fumigant to a beehive. In some embodiments, the treatment protocol may include supplying a predetermined amount of fumigant at a predetermined time. In some embodiments, determining the treatment protocol may include receiving the treatment protocol from a beekeeper or any other user. For example, a beekeeper may pre-program controller 140 or 240 to supply to the beehive the predetermined amount of fumigant at the predetermined time.

In some embodiments, determining the treatment protocol may include receiving one or more signals indicative of conditions inside the beehive, for example, signals indicative of the temperature, humidity, the activity level of the bees etc. The signals may be received from a sensor such as sensor 270A-270C. In some embodiments, determining the treatment protocol may be based on the received one or more signals. For example, the timing of application of the predetermined amount of fumigant may be determined based on the activity level of the bees in the beehive and/or the predetermined amount of fumigant may be determined based on the temperature in the beehive.

In box 820, embodiments may include controlling an automatic supply system (e.g., system 130 or 230) to extract a first predetermined portion of a carrier (e.g., carrier 125 or 225) comprising the predetermined amount of fumigant from a receiving area (e.g., receiving area 120 or 220) according to the treatment protocol. In some embodiments, the automatic supply system may include a delivery mechanism (e.g., delivery mechanism 135, 235 or 335) that may be configured to extract the first predetermined portion of the carrier, for example, from the receiving area. In some embodiments, controlling the automatic supply system may include retracting a second predetermined portion of the carrier to the receiving area.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus for disinfestation of beehives, comprising:
   a housing comprising:
      a solid carrier comprising a fumigant;
      a receiving area for receiving the; and
      an automatic supply system adapted to extract a predetermined portion of the solid carrier from the receiving area to an evaporation area accessible to an inner space of a beehive; and
      an ignitor, located at the evaporation area, for igniting and burning by a combustion procedure the predetermined portion of the solid carrier,
      wherein the automatic supply system comprises:
         a delivery mechanism that is configured to extract the predetermined portion of the solid carrier comprising a predetermined amount of fumigant from the receiving area; and
      a controller configured to control the automatic supply system to extract the portion of the solid carrier according to a treatment protocol.

2. The apparatus of claim 1, wherein the solid carrier is an absorbing material selected from the group consisting of a strip, tablet, fabric, and filter paper.

3. The apparatus of claim 1, wherein the evaporation area comprises a ventilation system.

4. The apparatus of claim 1, wherein the housing is configured to be inserted to the beehive via a bee entrance opening in the beehive.

5. The apparatus of claim 1, wherein the delivery mechanism comprises at least one of: one or more cylindrical rollers, a belt, a spring, a lead screw and a receptacle to receive the solid carrier.

6. The apparatus of claim 1, wherein the solid carrier includes absorbing material soaked with at least the fumigant.

7. The apparatus of claim 6, wherein the absorbing material is further soaked with a burning control material.

8. The apparatus of claim 1, wherein the solid carrier includes a combustible material.

9. The apparatus of claim 1, wherein the solid carrier includes a strip and the delivery mechanism is configured to deliver a portion of the strip comprising the predetermined amount of fumigant from the receiving area.

10. The apparatus of claim 1, wherein the_solid carrier comprises a plurality of absorbing material tablets soaked with the fumigant and the delivery mechanism is configured to deliver one or more tablets from the receiving area.

11. The apparatus of claim 1, wherein the solid carrier comprises volatile solid tablets comprising the fumigant,
and wherein the delivery mechanism is configured to extract one or more of the volatile solid tablets from the receiving area.

12. The apparatus of claim 1, further comprising at least one sensor configured to sense conditions inside the beehive,
and wherein the controller is further configured to control the automatic supply system based on signals received from the at least one sensor.

13. The apparatus of claim 12 wherein the sensor is at least one of: a temperature sensor, a humidity sensor, microphone, a light sensor, a biosensor, a chemical sensor, and a piezoelectric device.

\* \* \* \* \*